(No Model.)
T. F. DAVIDSON.
STOCK GUARD FOR RAILROADS
No. 251,419. Patented Dec. 27, 1881.
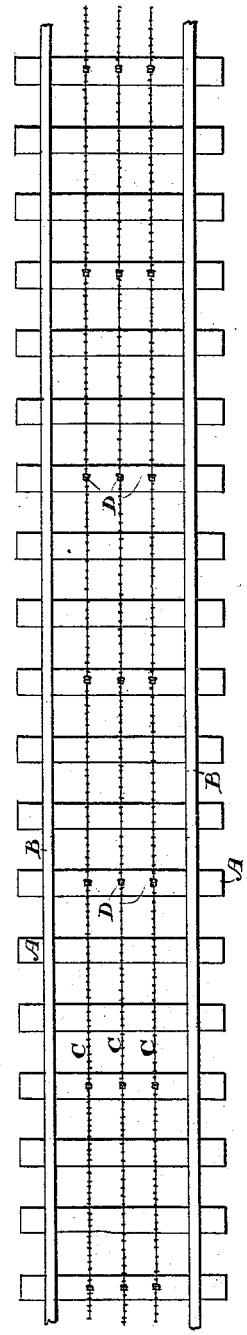
Fig. 1.
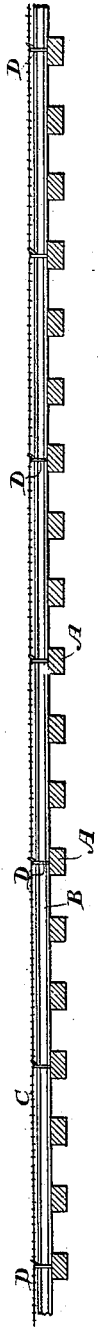
Fig. 2.
Fig. 4. Fig. 5.
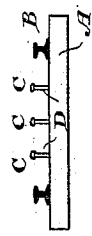
Fig. 3.
WITNESSES
Wm A. Skinkly
H. W. Elmore
INVENTOR
Thomas F. Davidson,
By his Attorneys
Baldwin, Hopkins, & Peyton.
N. PETERS, Photo-Lithographer, Washington, D. C.

UNITED STATES PATENT OFFICE.

THOMAS F. DAVIDSON, OF COVINGTON, INDIANA.

STOCK-GUARD FOR RAILROADS.

SPECIFICATION forming part of Letters Patent No. 251,419, dated December 27, 1881.

Application filed August 22, 1881. (No model.)

*To all whom it may concern:*

Be it known that I, THOMAS F. DAVIDSON, of Covington, in the State of Indiana, have invented a novel and useful Stock-Guard for Railroads, of which the following is a specification, reference being had to the accompanying drawings.

The most frequent cause of disastrous wrecks of trains of cars upon railroads is the resting of cattle and other stock upon the road-beds. This happens more often in the night, when droves of cattle, sheep, horses, mules, and hogs are apt to lie down upon the tracks, and, being little afraid of the noise of a train, will often, when sleepy or tired, the whole or part of them, refuse to rise and move out of the way. It frequently happens that engineers, seeing part of a drove rise and begin to move off the track, fail to notice that all have not started, and consequently fail to stop their trains, and a destructive smash-up results. To prevent such catastrophes, destructive alike to life and property, many devices have heretofore been resorted to. The most ordinary ones are fences upon both sides of the roadway; but they are so expensive that they cannot always be adopted, and thousands of miles of track in many parts of the country remain unprotected.

It is the object of my invention to provide a simple, cheap, and effective preventive within the reach of railroad companies of the most limited means, and universally applicable.

Accordingly my invention consists in applying ordinary barbed fence-wire along the road-beds between the rails, in a suitable manner to prevent stock from reposing or habitually traveling there.

In the accompanying drawings, Figure 1 is a plan view of my invention applied. Fig. 2 is a longitudinal section. Fig. 3 is a transverse section, and Figs. 4 and 5 are views of a spike which I prefer to employ.

A indicates the cross-ties; B, the rails, and C C C the barbed wires, held in place by the spikes D. These spikes I form with heads E, for driving them, and with side loops, F, near the heads, of any suitable character, for holding the barbed wires. In order that the spikes may be driven, with rapidity and without special attention, to a uniform depth in the ties, I provide a middle stop lug or projection, G, upon each one of them. I prefer to have the wires raised a little distance above the road-bed when in place, so that they will not only prevent stock from lying down there, but also prevent them from walking there, and the lug G will stop each spike at a uniform elevation for that purpose. I thus form a continuous railroad cattle-guard extending the entire length of the track, except at crossings and in yards, depots, and other places where it is necessary for train-men to be upon the track. It will be sufficient to drive the spikes in ties that are several feet apart—say, for example, in every fifth or sixth tie; but that is a matter which convenience and preference may determine. It is desirable that each section of wire—say one hundred feet in length—be wound around a spike at the end of the section and fastened. This will enable certain portions of the wire guard to be removed and replaced by track-men without disturbing other portions. The number of wires employed may be varied; but three will be sufficient, and for some reasons it is preferable to employ that number.

Having thus described my invention, what I claim, and desire to secure by Letters Patent, is—

1. The combination, with the road-bed of a railroad or tramway, of barbed wire extending longitudinally over the bed, substantially as described.

2. The combination, with the rails of a railway, of the wire C, the looped spikes D, and the ties in which the spikes are driven, substantially as described.

3. The wire-spike D for a road-bed, provided with a side loop near the top and a side lug or stop near the middle, substantially as and for the purpose described.

In testimony whereof I have hereunto subscribed my name this 6th day of August, A. D. 1881.

THOMAS F. DAVIDSON.

Witnesses:
PIERCE McMURTRIE,
S. F. MILLER.